(12) United States Patent
Kaku

(10) Patent No.: US 6,671,408 B1
(45) Date of Patent: Dec. 30, 2003

(54) MOTION IMAGE REPRODUCING APPARATUS

(75) Inventor: Junya Kaku, Itami (JP)

(73) Assignee: Sanyo Electric Co., Ltd., Osaka (JP)

(*) Notice: Subject to any disclaimer, the term of this patent is extended or adjusted under 35 U.S.C. 154(b) by 0 days.

(21) Appl. No.: 09/492,388

(22) Filed: Jan. 27, 2000

(30) Foreign Application Priority Data

Jan. 27, 1999 (JP) .......................................... 11-018557

(51) Int. Cl.[7] ................................................. G06K 9/36
(52) U.S. Cl. ...................................................... 382/232
(58) Field of Search ................................. 382/232, 233, 382/236, 238, 240, 242, 248, 250; 348/384.1, 394.1–395.1, 400.1–404.1, 407.1–416.1, 420.1–421.1, 425.2, 430.1–431.1

(56) References Cited

U.S. PATENT DOCUMENTS

| | | | | |
|---|---|---|---|---|
| 5,510,857 A | * | 4/1996 | Kopet et al. | 348/699 |
| 5,552,824 A | * | 9/1996 | DeAngelis et al. | 348/157 |
| 5,724,582 A | * | 3/1998 | Pelanek et al. | 395/620 |
| 5,771,330 A | * | 6/1998 | Takano et al. | 386/52 |
| 5,812,193 A | * | 9/1998 | Tomitaka et al. | 348/369 |
| 5,829,044 A | * | 10/1998 | Sono | 711/156 |
| 5,923,665 A | * | 7/1999 | Sun et al. | 370/477 |
| 5,953,488 A | * | 9/1999 | Seto | 386/109 |
| 6,041,396 A | * | 3/2000 | Widigen | 711/206 |
| 6,069,635 A | * | 5/2000 | Suzuoki et al. | 345/431 |
| 6,084,634 A | * | 7/2000 | Inagaki et al. | 348/294 |
| 6,094,234 A | * | 7/2000 | Nonomura et al. | 348/700 |
| 6,122,662 A | * | 9/2000 | Emura | 709/219 |
| 6,198,505 B1 | * | 3/2001 | Turner et al. | 348/222 |
| 6,310,627 B1 | * | 10/2001 | Sakaguchi | 345/630 |
| 6,366,316 B1 | * | 4/2002 | Parulski et al. | 348/239 |
| 6,400,887 B1 | * | 6/2002 | Takano et al. | 386/52 |
| 6,466,262 B1 | * | 10/2002 | Miyatake et al. | 348/218 |

FOREIGN PATENT DOCUMENTS

| | | |
|---|---|---|
| JP | 06-289846 | 10/1994 |
| JP | 08-102144 | 4/1996 |
| JP | 09-070005 | 3/1997 |
| JP | 9-331501 | 12/1997 |

OTHER PUBLICATIONS

Japanese Office Action dated Nov. 12, 2002.

* cited by examiner

Primary Examiner—Jose L. Couso
(74) Attorney, Agent, or Firm—Armstrong, Kratz, Quintos, Hanson & Brooks, LLP

(57) ABSTRACT

A motion image reproducing apparatus includes a mode change switch. If a reproduce mode is set by this mode change switch, compressed image data accommodated in a desired AVI file of a memory card is read out frame by frame in an intermittent fashion. The read-out 1-frame compressed image data is stored in an SDRAM and thereafter decompressed by a JPEG CODEC. The decompressed image data is outputted onto a monitor through the same SDRAM. As a result, a corresponding still image to the decompressed image data is displayed on a monitor screen. If decompressed image data is obtained, the compressed image data stored in the SDRAM becomes unnecessary. The unnecessary one of compressed image data will be overwritten by the succeeding one of compressed image data to be read out of the memory card.

12 Claims, 13 Drawing Sheets

MOTION IMAGE REPRODUCING APPARATUS

BACKGROUND OF THE INVENTION

1. Field of the Invention

This invention relates to motion image recording apparatuses and, more particularly, to a motion image reproducing apparatus which is applicable to a digital camera for reproducing motion image data recorded on a recording medium.

2. Description of the Prior Art

In the conventional motion image reproducing apparatus of this kind, the reproduced motion image data from the recording medium must be once stored in an internal memory. The data is thereafter outputted to a monitor through processing by a JPEG CODEC. For example, where reproducing 30 seconds of motion image data recorded on a recording medium, this 30-seconds motion image data in its entirety is first stored in the internal memory. Thereafter, the data is subjected to decompression on 1-frame basis, being outputted onto the monitor.

In the prior art, however, there is a necessity to store all the reproducing motion image data to the internal memory. This results in a problem that the amount of data reproducible is relied upon a memory capacity.

SUMMARY OF THE INVENTION

It is therefore a primary object of the present invention to provide a motion image reproducing apparatus which is capable of reproducing motion images for a long time period regardless of a memory capacity.

In accordance with the present invention, a motion image reproducing apparatus for reproducing a data file containing a plurality of frames of image data and image administrating information to administrate the plurality of frames of image data, thereby displaying motion images on a monitor, comprising: a selector for selecting each of a plurality of frame numbers at a predetermined time interval; an image data reader for reading 1 frame of image data out of the data file based on a frame number selected by the selector and the image administrating information; an image data writer for writing the 1frame of image data read out by the image data reader to an internal memory; and a display circuit for displaying a still image on the monitor based on the 1 frame of image data written in the internal memory.

When reproducing is made on a data file to display motion images on the monitor, selector selects each of a plurality of frame numbers at a predetermined time interval. The image data reader reads out 1 frame of image data out of the data file based on a frame number selected by the selector and image administrating information. The read-out 1-frame image data is written to the internal memory by the image data reader. The display circuit causes a still image to be displayed on the monitor based on the written 1-frame image data in the internal memory. Because the frame numbers are selected at the predetermined time interval, the corresponding one of image data to the frame numbers are read from the data file at the predetermined time interval and written to the internal memory at the predetermined time interval. Due to this, on the monitor is displayed a motion image constituted by a plurality of still images.

In accordance with the invention, the image data is written frame by frame to the internal memory in an intermittent fashion so that still images can be displayed on the monitor based on the each-framed image data written in the internal memory. It is therefore possible to reproduce a long-time motion image even if the internal memory is small in capacity.

In one embodiment of the invention, the image administrating information includes a beginning address of each frame of image data.

In another embodiment of the invention, the 1 frame of image data written in the internal memory is renewed by image data read out with delay by the image data reader.

In still another embodiment of the invention, the internal memory has at least two storage areas to store the 1 frame of image data. The display circuit displays the still image on the monitor based on the 1 frame of image data written in one of the storage areas. On the other hand, the image data writer writing the 1 frame of image data to a storage area not under a display process.

In yet another embodiment of the invention, the image data is compressed data having been compressed according to a predetermined scheme, and the display circuit including a decompression circuit and an output circuit. The decompression circuit decompresses the 1 frame of image data written in the internal memory, and the output circuit outputs to the monitor image data having been decompressed by the decompression circuit. Here, the predetermined scheme is preferably JPEG.

In another embodiment of the invention, the data file further includes sound data related to the plurality of frames of image data and sound administrating information to administrate the sound data. A sound data reader reads sound data related to 1 frame out of the data file based on a frame number selected by the selector and the sound administrating information. A sound output circuit outputs at a predetermined timing the sound data read out by the sound data reader. Here, the data file preferably accommodates alternately a predetermined time period of sound data and image data in a corresponding number of frames to the predetermined time period.

In accordance with the present invention, a motion image reproducing apparatus for reproducing a first number of frames of image data and a data file containing image administrating information to administrate the first number of frames of image data, thereby displaying motion images on a monitor, comprising: a selector for selecting each of a plurality of frame numbers at a predetermined time interval; an image data reader for reading a second number of frames of image data less than the first number of frames out of the data file based on a frame number selected by the selector and the image administrating information; an image data writer for writing the second number of frames of image data read by the image data reader to an internal memory; and a display circuit for displaying corresponding motion images to the second number of frames on the monitor based on the second number of frames of image data written in the internal memory.

When reproducing is made on a data file to display motion images on the monitor, selector selects each of a plurality of frame numbers at a predetermined time interval. The image data reader reads, out of the data file, image data in a second number of frames less than a first number of frames based on a frame number selected by the selector and image administrating information. The read-out image data in the second number of frames is written to the internal memory by the image data reader. The display circuit causes motion images in the second number of frames to be displayed on the monitor based on the written image data in the second number of frames in the internal memory. Because the frame numbers are selected at the predetermined time interval, the related second number of frames of image data to each of the frame numbers are read from the data file at the predetermined time interval and written to the internal memory at the predetermined time interval. Due to this, on the monitor is displayed a motion image constituted by the greater number of frames than the second number of frames.

In accordance with the invention, the image data is written in an amount of the second number of frames a time to the internal memory in an intermittent fashion so that a motion image can be displayed on the monitor based on the image data written in the internal memory. It is therefore possible to reproduce a long-time motion image even if the internal memory is small in capacity.

In one embodiment of the invention, the image data is compressed data having been compressed according to a predetermined scheme, and the display circuit including a decompression circuit and an output circuit. The decompression circuit decompresses the second number of frames of image data written in the internal memory, while the output circuit outputs the second number of frames of image data decompressed by the decompression circuit to the monitor.

In another embodiment of the invention, the data file further includes sound data related to the first number of frames of image data and sound administrating information to administrate the sound data. A sound data reader reads sound data related in time period to the second number of frames out of the data file based on a frame number selected by the selector and the sound administrating information. A sound output circuit outputs at a predetermined timing the sound data read out by the sound data reader.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
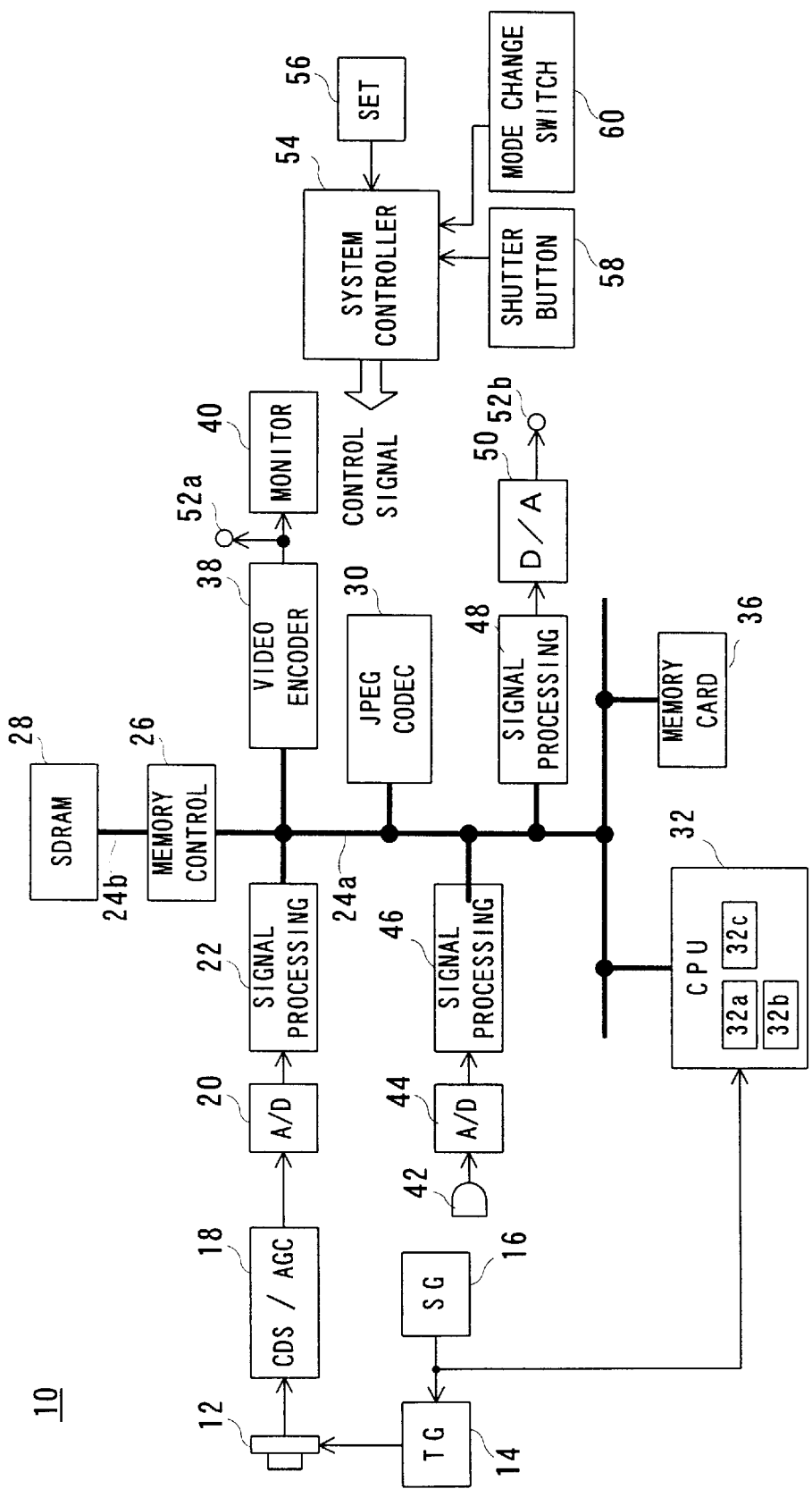
FIG. 1 is a block diagram showing one embodiment of the present invention.

Referring to FIG. 1, a digital camera 10 of this embodiment includes a CCD imager 12. The CCD imager 12 has a color filter (not shown) arranged at a front thereof so that a subject optical image is taken through this color filter to the CCD imager 12.

If a mode change switch 60 is switched to a "CAMERA" side, a system controller 54 provides setting for a camera mode. A timing generator (TG) 14 creates a timing signal based on a vertical synchronizing signal and horizontal synchronizing signal outputted from a signal generator (SG) 16, thereby driving the CCD imager according to a thinning-out scheme. As a result, a low-resolution camera signal on the subject is outputted from the CCD imager 12. The output camera signal is subjected to well-known noise removal and level adjustment by a CDS/AGC circuit 18, and then converted into camera data as a digital signal by an A/D converter 20. A signal processing circuit 22 performs YUV conversion on the camera data outputted from the A/D converter 20 to produce YUV data. The produced YUV data is supplied together with a write request to a memory control circuit 26. Given a write request, the memory control circuit 26 fetches the YUV data through a bus 24a and then writes the fetched YUV data to an SDRAM 28 through a bus 24b.

Meanwhile, a video encoder 38 requests the memory control circuit 26 to read out YUV data. The YUV data stored in the SDRAM 28 is read out by the memory control circuit 26 and sent to a video encoder 38 through the bus 24a. The video encoder 38 produces, from the input YUV data, a composite image signal in conformity to an NTSC format, followed by outputting the produced composite image signal onto a monitor 40. As a result, motion images of the subject are displayed real-time on the monitor 40.

Incidentally, the SDRAM 28 has one port only so that the bus 24b is connected to this single port. The composite image signal is also given to an output terminal 52a through which the signal can be outputted to the outside.

If an operator manipulates a shutter button 58, the subject image and sound are recorded on a memory card 36. Specifically, if the operator presses once the shutter button 58, a CPU 32 enables a microphone 42, A/D converter 44 and signal processing circuit 46 and further sends a compression command to a JPEG CODEC 30.

The signal processing circuit 46 performs a predetermined process on the sound data inputted through the microphone 42 and A/D converter 44, and outputs the processed sound data together with a write request to the memory control circuit 26. The memory control circuit 26 writes the output sound data from the signal processing circuit 46 to the SDRAM 28 through the bus 24b. On the other hand, the JPEG CODEC 30 responds to the compression commands and outputs a YUV-data read request to the memory control circuit 26. In response to the read request, the memory control circuit 26 reads out one frame of YUV data, i.e. one screen of still image data, and send it to the JPEG CODEC 30 through the bus 24a. This results in JPEG compression on the still image data. That is, one compression process produces one frame of compressed image data (JPEG data). The JPEG CODEC 30 delivers the produced compressed image data, together with a write request, to the memory control circuit 26. Accordingly, the compressed image data is also stored to the SDRAM 28 through the bus 24b.

As long as the shutter button 58 is not pressed by the operator, the CPU 32 continues to activate the microphone 42 and signal processing circuit 46 to repeatedly give compression commands to the JPEG CODEC 30. This results in accumulation of sound data and compressed image data within the SDRAM 28. If the shutter button 48 is pressed, the CPU 32 disables the microphone 42 and signal processing circuit 46 to suspend the compression commands from being outputted to the JPEG CODEC 30, and supplies the memory control circuit 26 a request to read out sound data and compressed image data. In response, the memory control circuit 26 reads out alternately 1 second of sound data and 15 frames of compressed image data. The read sound data and compressed image data are sequentially recorded onto the memory card 36 by the CPU 32.

Figure 2:
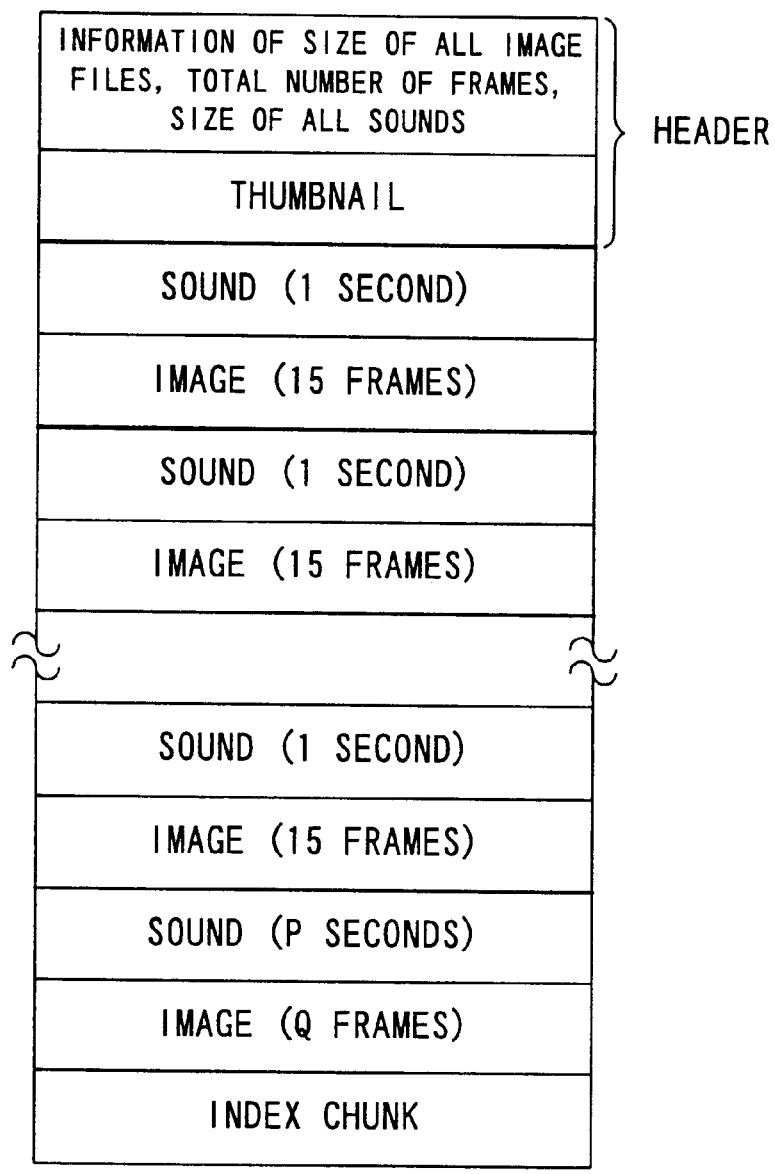
FIG. 2 is an illustrative view showing an AVI file.

In the memory card 36, newly created is a header for an AVI (Sound Video Interleave) file in response to a first operation of the shutter button 58. The sound data and compressed image data are written in and following a header. This results in alternate formation of sound chunks each configured by 1 second (7866 bytes) of sound data and image chunks each configured by 15 frames of compressed image data, as shown in FIG. 2. Note that in this embodiment 1 second of motion image is configured by 15 frames, and correspondence is given to between one sound chunk and the following one image chunk. One data unit is formed by a sound chunk and an image chunk that are in a corresponding relation.

The AVI file header is written with header information, such as a total file size, total number of frames and total sound sizes, as well as head-frame thumbnail image data (compressed data). Meanwhile, an index chunk provided at a last is written with beginning addresses of sound chunks and compressed image data beginning addresses of frames, i.e. index information. With such index information, the sound data is administrated on a 1-second basis while the compressed image data is on a 1-frame basis.

If the mode change switch 50 is switched to a "REPRODUCE" side and a desired AVI file is selected, the CPU 32 detects such a desired AVI file in the memory card 36. Furthermore, header information and index information are read out of the detected AVI file and written to a memory 32a. The CPU 32 recognizes a total number of frames N based on the header information, and specifies the compressed image data and sound data to be reproduced based on the index information.

Figure 3:
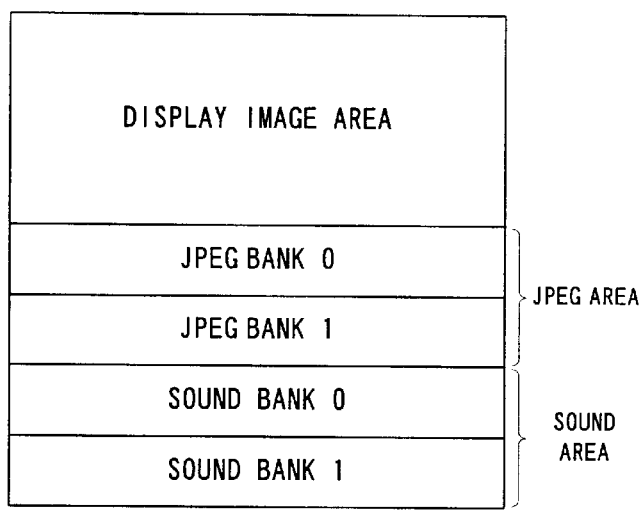
FIG. 3 is an illustrative view showing an SDRAM.
Figure 4:
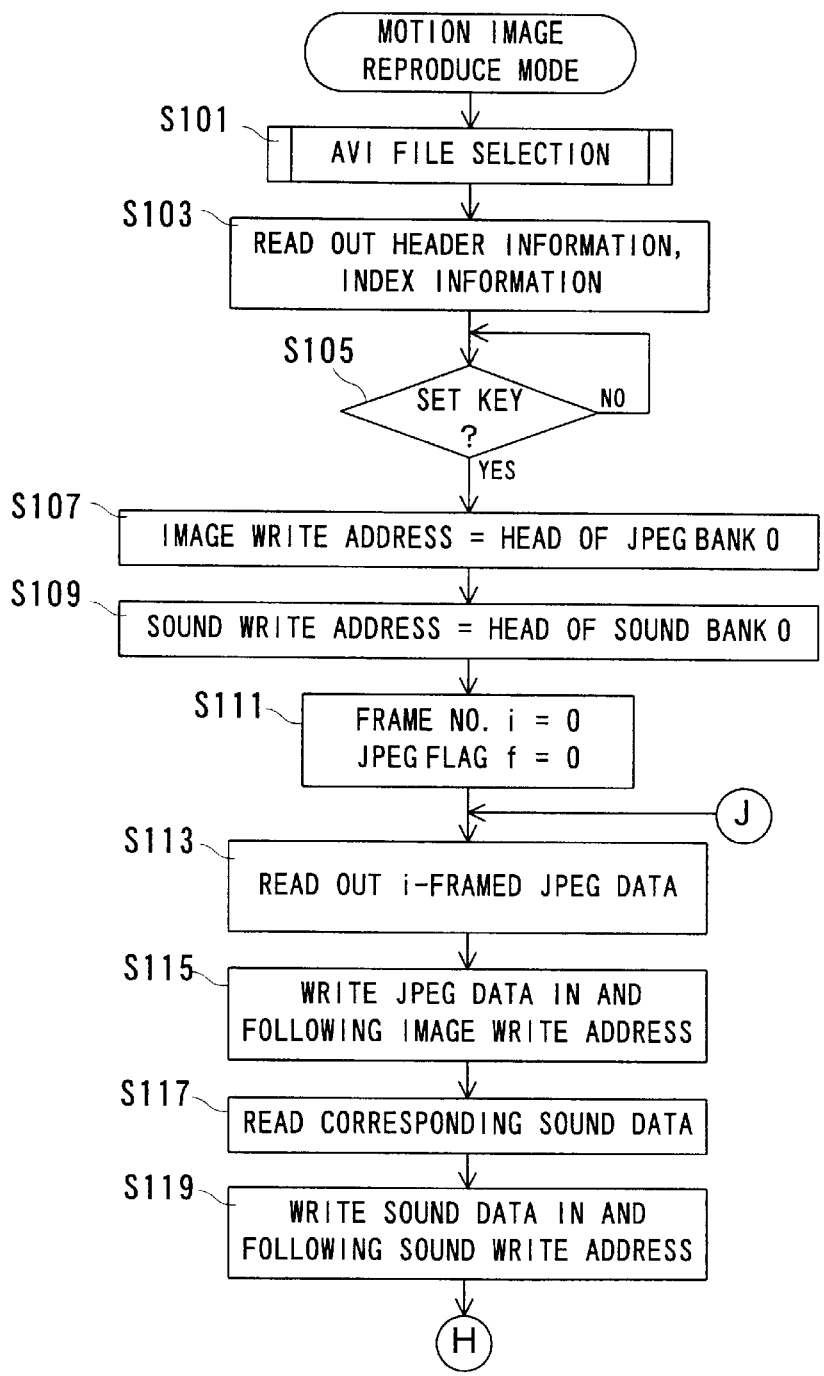
FIG. 4 is a flowchart showing part of operation of the FIG. 1 embodiment.
Figure 5:
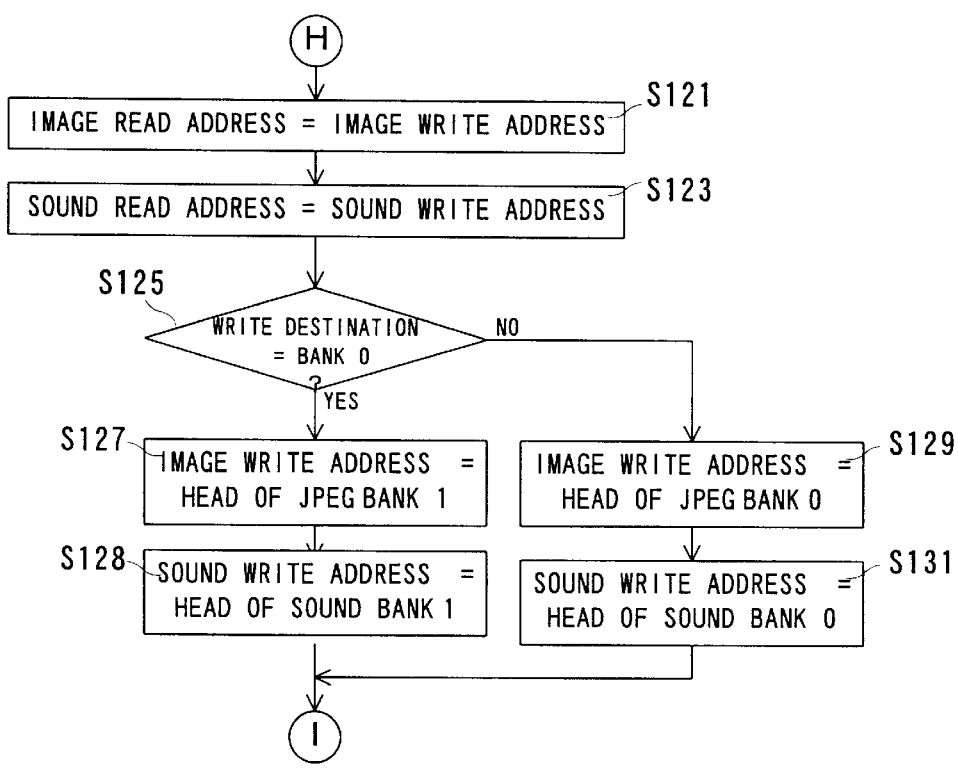
FIG. 5 is a flowchart showing another part of the operation of the FIG. 1 embodiment.
Figure 6:
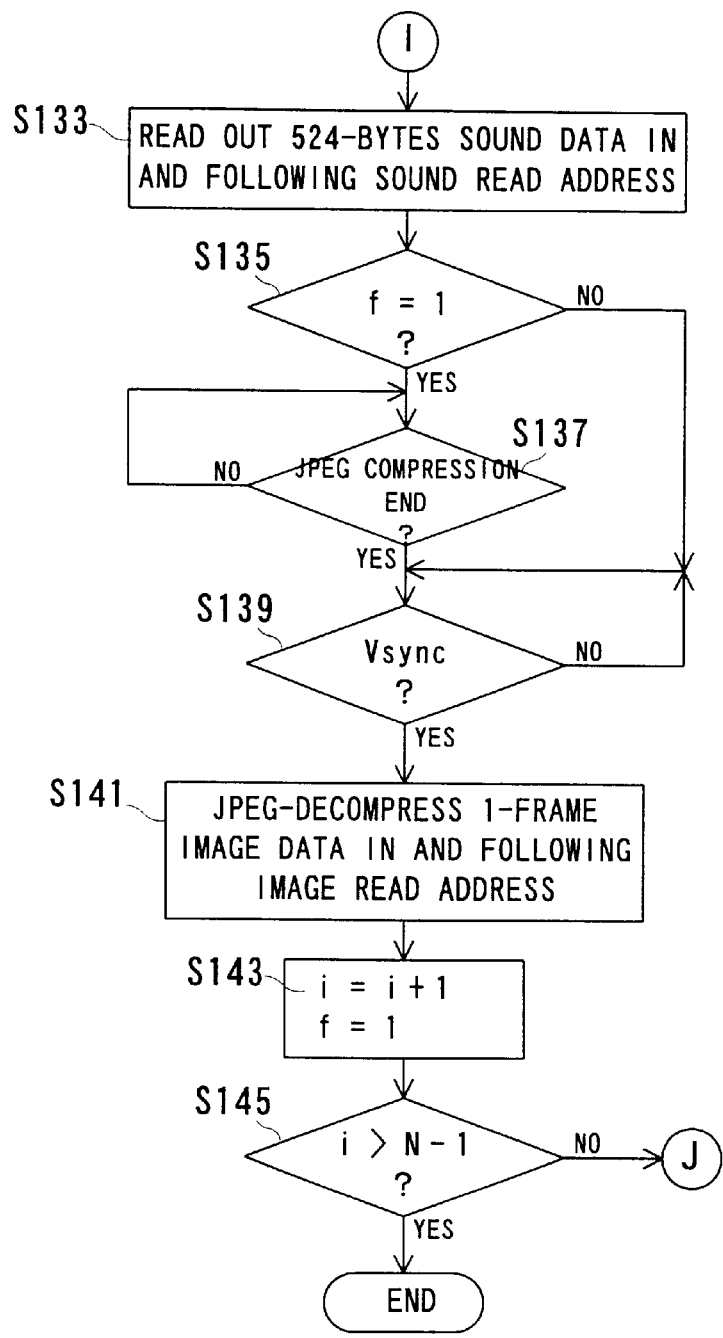
FIG. 6 is a flowchart showing still another part of the operation of the FIG. 1 embodiment.

When the operator operates a SET key 56, the CPU 32 reads, frame by frame, the compressed image data out of the desired AVI file at an interval of 1/15th of a second, and requests the memory control circuit 26 to write the read compressed image data. As a result, each frame of compressed image data thus intermittently read out is supplied through the bus 24b to the SDRAM 28 where it is written onto a JPEG area as shown in FIG. 3. The JPEG area has JPEG bank 0 and JPEG bank 1 wherein each bank has a capacity of 1 frame. The memory control circuit 26 writes the each-frame-based compressed data alternately onto the JPEG bank 0 and JPEG bank 1.

The CPU 32 further instructs the JPEG CODEC 30 at an interval of 1/15th of a second to decompress the compressed image data. The JPEG CODEC 30, in turn, requests the memory control circuit 26 to read out the compressed image data. As a result, 1 frame of compressed image data is read out by the memory control circuit 26. Reading-out is performed in a same order as writing. The compressed image data is read out alternately of the JPEG bank 0 and the JPEG bank 1, in an intermittent fashion. The read compressed image data is then inputted through the buses 24b and 24a to the JPEG CODEC 30 where it is decompressed frame by frame at an interval of 1/15th of a second.

The JPEG CODEC 30 requests the memory control circuit 26 to write the decompressed still image data each time one decompression process has been completed. The memory control circuit 26, each time given a request, writes each frame of still image data onto a display image area shown in FIG. 3. The display image area has a capacity of only 1 frame. As a consequence, the still image data of a preceding frame is renewed by the still image data of a current frame at an interval of 1/15th of a second.

The video encoder 38 requests the memory control circuit 26 to read out still image data, at an interval of 1/15th of a second. In response to the request from the video encoder 38, the memory control circuit 26 reads still image data out of the display image area and supplies it to the video encoder 38 via the buses 24b and 24a. The video encoder 38 converts the still image data into a composite image signal to be supplied to the monitor 40 as well as to an output terminal 52a. As a result, the still image being displayed on the monitor 40 is renewed every 1/15th of a second, thereby forming motion images based on the still images.

The CPU 32, each time it reads out 1 frame of compressed image data out of an AVI file, reads the corresponding 524 (=7866/15) bytes of sound data out of the same AVI file. That is, the sound data is read out by 524 bytes a time and at an interval of 1/15th of a second. The CPU 32 supplies the read sound data, together with a write request, to the memory control circuit 26. The memory control circuit 26, in turn, writes the sound data onto a sound area shown in FIG. 3. The sound area is formed by sound bank 0 and sound bank 1 each of which has a capacity of 524 bytes. The intermittently-read 524-bytes sound data is written, alternately, onto the sound bank 0 and sound bank 1.

Each time writing to one sound bank has been completed, the CPU 32 instructs the signal processing circuit 48 to perform sound processing. Such instructions are outputted every 1/15th of a second. The signal processing circuit 48, each time given one instruction, requests the memory control circuit 26 to read out sound data. The memory control circuit 26 responds to this request and reads sound data out of the above one sound bank. The read sound data is delivered via the buses 24b and 24a to the signal processing circuit 48 where it is subjected to predetermined processing. The processed sound data is converted into an analog signal by a D/A converter 50 and thereafter outputted through an output terminal 52b.

As described above, in the reproduce mode, requests are outputted by the CPU 32, JPEG CODEC 30, video encoder 38 and signal processing circuit 48. Due to this, the memory control circuit 26 writes/reads to or from the SDRAM 28 while mediating between the requests. Meanwhile, in order to prevent a current frame of compressed image data to be decompressed by the JPEG CODEC 30 from being overwritten by a next frame of compressed image data, the next-frame compressed image data is written onto a JPEG bank of not under reading. For a similar reason, writing of sound data is onto a sound bank of not under reading.

The CPU 32 concretely processes a flowchart shown in FIG. 4 to FIG. 8, thereby reproducing desired motion image and sound from the memory card 36.

First, in step S101 a desired AVI file is selected from among plurality of AVI files recorded on the memory card 36. Next, in step S103 header information and index information are read out of the desired AVI file and stored to the memory 32a. If the SET key 56 is pressed herein by an operator, the CPU 32 determines "YES" in step S105. In step S107 an image write address $V_{WA}$ is set to a head address of the JPEG bank 0, and in step S109 a sound write address $A_{WA}$ is set to a head address of the sound bank 0. Furthermore, in step S111 the counter 32b and JPEG flag 32c are reset. The count value i of the counter 32b represents a frame number while JPEG flag 32c set/reset signifies whether the JPEG CODEC 30 is under a decompression process or not.

The CPU 32 subsequently proceeds to step S113 to read i-framed compressed image data out of the memory card 36 based on the index information. Furthermore, in step S115 the memory control circuit 26 is requested to write this compressed image data. Accordingly, the read-out compressed image data is written to a position of in or following the image write address $V_{WA}$. In the case of reading out head-framed compressed image data, the compressed image data is stored on the JPEG bank 0. Furthermore, CPU 32 in step S117 reads 524-bytes sound data corresponding to the ith-frame out of the memory card 36 based on the index information, and in step S119 requests the memory control circuit 26 to write this sound data. The read-out sound data is stored in a position of in or following the sound write address $A_{WA}$. In the case that the read-out sound data corresponds to the head frame, writing is onto the sound bank 0. In this manner, the CPU 32 specifies to-be-read compressed image data and sound data based on the index information and count value i.

The CPU 32 thereafter in steps S121 and S123 sets image read address $V_{RA}$ and sound read address $A_{RA}$, respectively, to the current image write address $V_{WA}$ and the current sound write address $A_{WA}$. Subsequently, in steps S125–S131 bank switching is made for both of image and sound. That is, it is determined in step S125 whether the current image write address $V_{WA}$ represents the JPEG bank 0 or not. If "YES", in respective steps S127 and S128 the image write address $V_{WA}$ is set to a head of the JPEG bank 1 and the sound write address $A_{WA}$ is to a head of the sound bank 1. On the other hand, if "NO", in respective steps S129 and S131 the image write address $V_{WA}$ is set a head of the JPEG bank 0 and the sound write address $A_{WA}$ is to a head of the sound bank 0.

In step S133 the signal processing circuit 48 is instructed to perform a sound process. The signal processing circuit 48 requests the memory control circuit 26 to read out sound data. As a result, 524 bytes of sound data positioned in and following the current sound read address $A_{RA}$ is read out by the memory control circuit 26.

The CPU 32 subsequently determines in step S135 whether the JPEG flag 32c is set or not. If "NO" here, the process advances directly to step S139. However, if "YES", it is determined in step S137 that 1-frame compression has ended, and then the process advances to step S139. Incidentally, the JPEG CODEC 30 outputs end signals each time compression process on each frame has ended. The CPU executes the step S137 based on the end signal.

In step S139 it is determined whether a vertical synchronizing signal has outputted from the SG16 or not. Because the vertical synchronizing signals are generated at an interval of 1/15th of a second, the CPU 32 proceeds to step S141 at the interval of 1/15th of a second. Incidentally, the decompression process on each frame due to the JPEG CODEC 30 is usually completed within a time of 1/15th of a second.

In step S141, the JPEG CODEC 30 is instructed to perform a decompression process. The JPEG CODEC 30 responds to the instruction and requests the memory control circuit 26 to read out compressed image data. The memory control circuit 26 responds to the request and reads out 1 frame of compressed image data in and following the image read address $V_{RA}$. The JPEG CODEC 30 decompresses the read-out compressed image data. Completing the decompression, the JPEG CODEC 30 outputs an end signal to the CPU 32 and requests the memory control circuit 26 to write the decompressed still image data. As a result, the 1-frame still image data decompressed at this time is written onto the display image area by the memory control circuit 26.

Incidentally, the video encoder 38 generates requests at an interval of 1/15th of a second without receiving instructions from the CPU 32. The memory control circuit 26 responds to such a request and reads, out of the display image area, still image data to be sent to the video encoder 38. As a result, the corresponding image is displayed on the monitor 40.

The CPU 32, after outputting a decompression instruction in step S141, advances to step S143 to increment the counter 32b and sets the JPEG flag 32c. That is, the counter 32b is incremented to specify the compressed image data and sound data to be next read out of the memory card 36, and the JPEG flag 32c is set to provide "YES" determination in the next step S135 process. The CPU 32 thereafter in step S145 compares the current count value i with "N−1". If i ≦N−1, the process returns to step S113 in order to reproduce the remaining motion images and sounds. However, if i <N−1, it is considered that the reproduction of motion images and sounds has all mean completed thus ending the process.

According to this embodiment, the SDRAM is written by 1-frame compressed image data a time and by 524-bytes sound data a time. These of data, after completed of a predetermined image and sound processing, are respectively overwritten by the succeeding ones of compressed image data and sound data. It is therefore possible to reduce the SDRAM capacity as compared to the prior art requiring writing to the SDRAM all the compressed image and sound data accommodated in a desired AVI file.

Also, where conducting reproduction at a quadruple speed, it is satisfactory to read out compressed image data once per four frames. In this embodiment, the frame to be read out is specified by the counter so that read-out can be performed on only the specified 1 frame. That is, it is possible to read out compressed image data only of a desired frame, i.e. the required and satisfactory compressed image data, by merely controlling the counter. As a result, reproduction is readily possible at a desired speed. Such an effect is free reflected in conducting high speed reproduction in a reverse direction.

Furthermore, in this embodiment, two banks are formed in each of the JPEG area and the sound area, it is possible to perform writing onto one bank without the necessity of grasping a situation of reading from the other bank.

Figure 7:
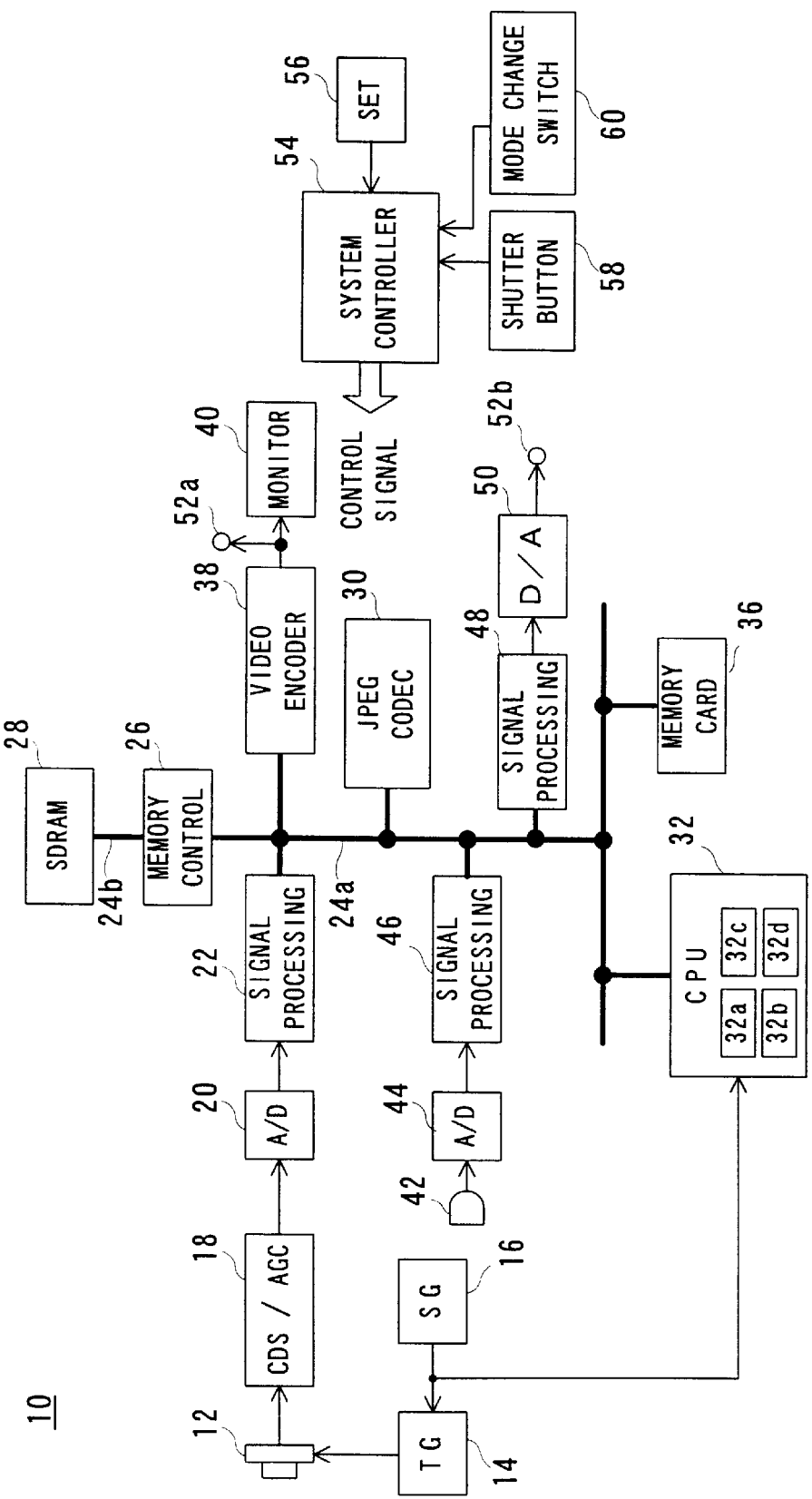
FIG. 7 is a block diagram showing another embodiment of the invention.

A digital camera 10 of another embodiment is configured as shown in FIG. 7. However, this digital camera 10 includes many similar parts to those of FIG. 1 to FIG. 6, having little difference therefrom in respect of operation in the camera mode. Accordingly, concrete explanations will be made on a reproduce mode, omitting duplicated explanations on the camera mode.

In a reproduce mode, if a desired AVI file is designated, the CPU 32 detects a same AVI file of the memory card 36, and writes header and index information of the detected AVI file to the memory 32a.

Figure 8:
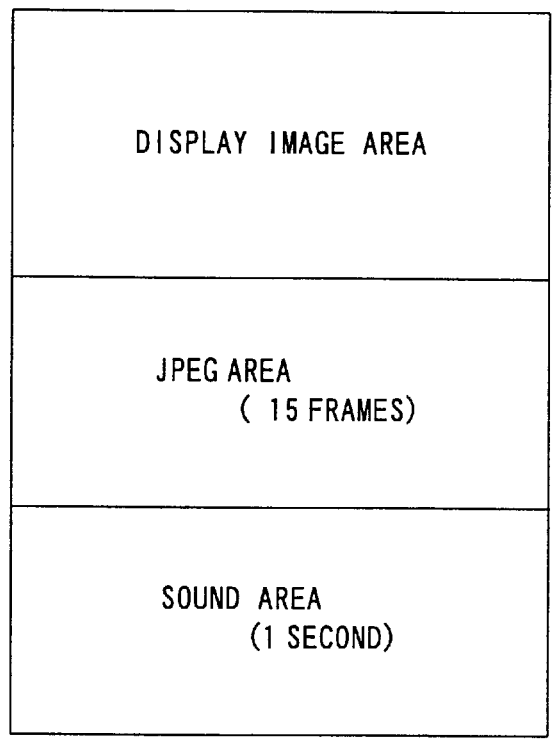
FIG. 8 is an illustrative view showing an SDRAM.
Figure 9:
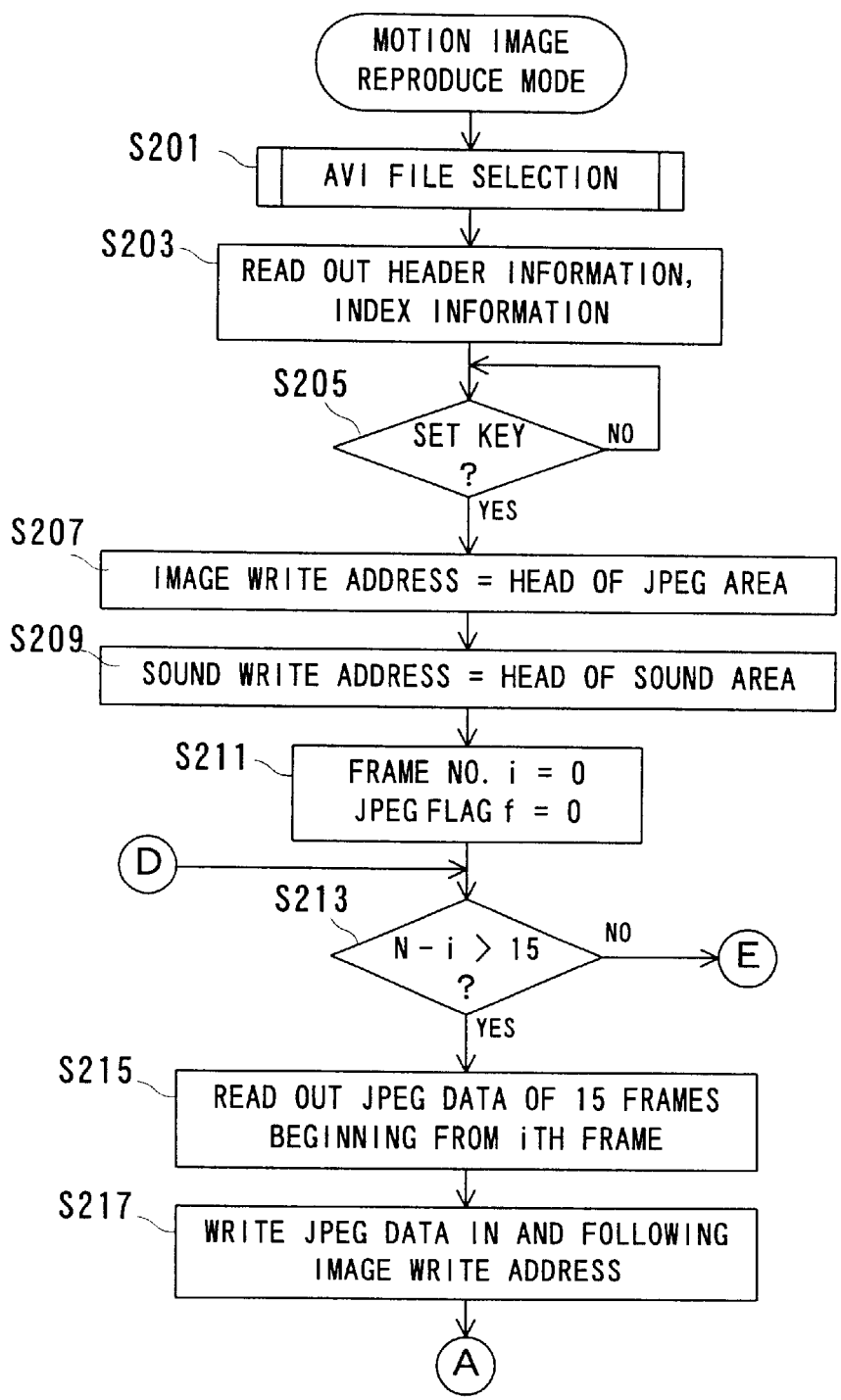
FIG. 9 is a flowchart showing part of operation of the FIG. 7 embodiment.
Figure 10:
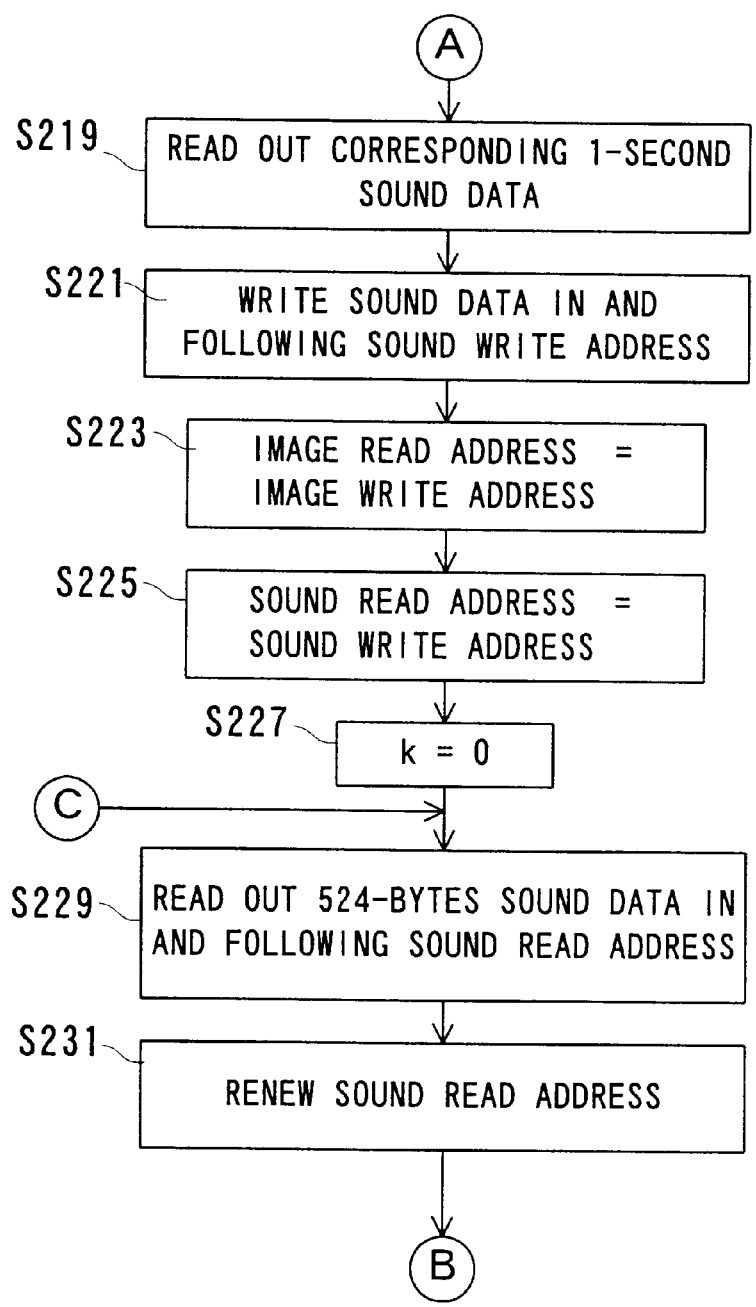
FIG. 10 is a flowchart showing another part of the operation of the FIG. 7 embodiment.
Figure 11:
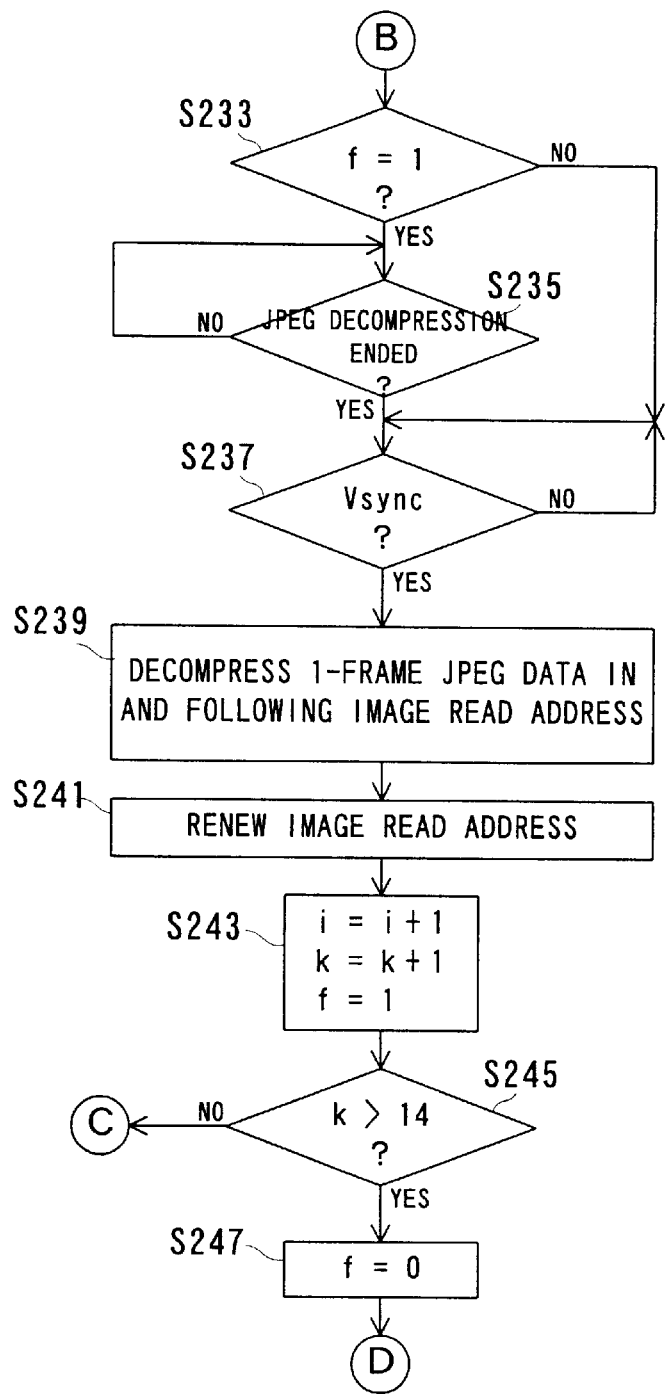
FIG. 11 is a flowchart showing still another pat of the operation of the FIG. 7 embodiment.

If the operator manipulates a SET key 56, the CPU 32 reads out, 15 frames a time, compressed image data accommodated in the desired AVI file and requests the memory control circuit 26 to write the read-out compressed image data. The to-be-read compressed image data is specified based on the index information. The read compressed image data is stored, through buses 24a and 24b, to a JPEG area of an SDRAM 28. The JPEG area has a capacity of 15 frames, as shown in FIG. 8. The 15-frame compressed image data continuously read-out is written fully in the JPEG area. Note that the value of 15 frames corresponds to the number of frames of the compressed image data contained in one image chunk.

If the CPU 32 instructs the JPEG CODEC 30 to decompress the compressed image data, the JPEG CODEC 30 requests the memory control circuit 26 to read out the compressed image data. In response, the memory control circuit 26 reads out, at an interval of 1/15th of a second, each frame of compressed image data stored in the JPEG area. The JPEG CODEC 30 performs decompression on the read-out compressed image data and generates request each time one processing has been completed. The memory control circuit 26 responds to the request and writes each frame of still image data to a display image area shown in FIG. 8. Incidentally, the display image area has a capacity of only 1 frame similarly to the embodiment of the FIG. 1 to FIG. 6 so that the each frame of still image data is renewed at an interval of 1/15th of a second. The still image data on the display image area is read out based on a request outputted at an interval of 1/15th of a second by a video encoder 38. As a result, motion images are displayed on a monitor 40.

The CPU 32, each time it reads out 15 frames of compressed image data, reads out the corresponding sound data from the same file and at the same time generates a write request. Due to this, the read-out sound data is written onto a sound area shown in FIG. 8. The time corresponding to 15 frames is 1 second, and accordingly the sound data continuously read out of an AVI file possesses a data amount of 1 second. Because the sound area has a capacity of 1 second, the sound data continuously read out is stored fully in the sound area. Incidentally, the address that reading out is to be made is specified based on index information.

When 1-second sound data has been written, the CPU instructs the signal processing circuit 48 to perform a sound process. The instructions for sound processing are outputted at an interval of 1/15th of a second. The signal processing circuit 48, each time one instruction is given, requests the memory control circuit 26 to read out sound data. The memory control circuit 26 responds to this request and reads sound data, by 1/15seconds (524 bytes) a time, out of the sound area and supplies it to the signal processing circuit 48. After completing a predetermined process in the signal processing circuit 48, the sound data is outputted onto an output terminal 52b through a D/A converter 50.

The CPU 34 concretely processes a flowchart shown in FIG. 9 to FIG. 13, thereby reproducing desired motion images and sounds from the memory card 36.

First, in step S201 designated is a desired AVI file of the memory card 36. Next, in step S203 header information and index information are stored to the memory 32a. If the SET key 56 is pressed by an operator, the CPU 32 in step S205 determines "YES". In step S207 an image write address $V_{WA}$ is set to a head address of the JPEG area. In step S209 a sound write address $A_{WA}$ is set to a head address of the sound area. In step S211 reset are a counter 32b representing a frame number i and JPEG flag 32c presenting the presence or absence of decompression execution. In step S213 it is determined whether a subtraction value of a current frame number i from the total number of frames N is greater than "15" or not. If "YES", the process proceeds to step S215 while if "NO", the process advances to step S249 of FIG. 12.

In step S215 the compressed image data of 15 frames beginning from the i-numbered frame is read out of the AVI file based on the index information. In the succeeding step S217 the memory control circuit 26 is requested to write the above compressed image data. As a result, 15-frames compressed image data is written in and following the image write address $V_{WA}$, i.e. JPEG area. The CPU 32 thereafter advances to step S219 to read out 1 second of sound data corresponding to the above 15 frame out of the AVI file based on the index information. In step S221, the memory control circuit 26 is requested to write the 1-second sound data. As a result, the sound data is written in and following the sound write address $A_{WA}$, i.e. sound area.

The CPU 32 in steps S223 and S225 sets the image read address $V_{RA}$ and sound read address $A_{RA}$, respectively, to the current image write address $V_{WA}$ and sound write address $A_{WA}$. In step S227 the CPU 32 resets a counter 32d representing a frame number ($0 \leq k \leq 14$) in the JPEG area. In step S229 read is sound data of 524 bytes (1/15th of a second) in and following the sound read address $A_{RA}$, and in the succeeding step S231 the sound read address $A_{RA}$ is renewed according to Equation 1. That is, the address $A_{RA}$ is put forward by 524 bytes.

$$A_{RA}=A_{RA}+524 \text{ bytes} \qquad (1)$$

VSIZE: the size of 1-frame compressed image data

When the sound read address $A_{RA}$ is renewed, the CPU 32 in step S223 determines a state of the JPEG flag 32c. If the JPEG flag 32c is in a reset state, a process directly proceeds to step S237. However, if the JPEG flag 32c is in a set state, it is determined in step S235 that a decompression process has been ended, followed by advancement of the process to step S237.

The SG16 generates vertical synchronizing signals at an interval of 1/15th of a second. It is determined in step S237 whether such a signal has been outputted from the SG 16 or not. If "YES", in step S139 the JPEG CODEC 30 is instructed to perform a decompression process. The JPEG CODEC 30 responds to this instruction and requests the memory control circuit 26 to read out 1 frame of compressed image data. As a result, the compressed image data of 1 frame in and following the current image read address $V_{RA}$ is read out. The read-out compressed image data is subjected to decompression by the JPEG CODEC 30. Completing the process, the JPEG CODEC 30 supplies the memory control circuit 26 with the still image data, together with write request. Due to this, the still image data is written onto the display image area shown in FIG. 8. The still image data of the display image area is read out based on a request given from the video encoder 38. As a result, images are displayed correspondingly on the monitor 40.

The CPU 32 in step S239 outputs a decompression instruction and then in step S241 renews the image write address $V_{WA}$ according to Equation 2. Due to this, the address $V_{WA}$ is advanced by 1 frame.

$$V_{WA}=V_{WA}+V_{SIZE} \qquad (2)$$

$V_{SIZE}$: the size of 1-frame compressed image data

Thereafter, in step S243 the counter 32b (frame number i) and counter 32d (frame number k) are incremented and the JPEG flag 32c is set. Based on the incremented frame number k, specified are compressed image data next to be read out of the JPEG area and sound data next to be read out of the sound area.

In step S245 the frame number k is compared with "14". If $k \leq 14$, the process returns to step S229. Consequently, the process of the steps S229–S245 is repeated until all the data has been read out of the JPEG area and sound area. On the other hand, if k<14, in step S247 the JPEG flag 32c is reset and then the process returns to the step S213. Before determined k>14, the frame number i is incremented 15 times. Accordingly, when "YES" is determined in step S213, in the later-staged steps S215 and S219 specified are compressed image data and sound data next to be read out of the AVI file based on the incremented frame number i and index information. As a result, in step S229 and the subsequent, write and read processes are executed for the next 15-frames compressed image data and 1-second sound data.

Figure 12:
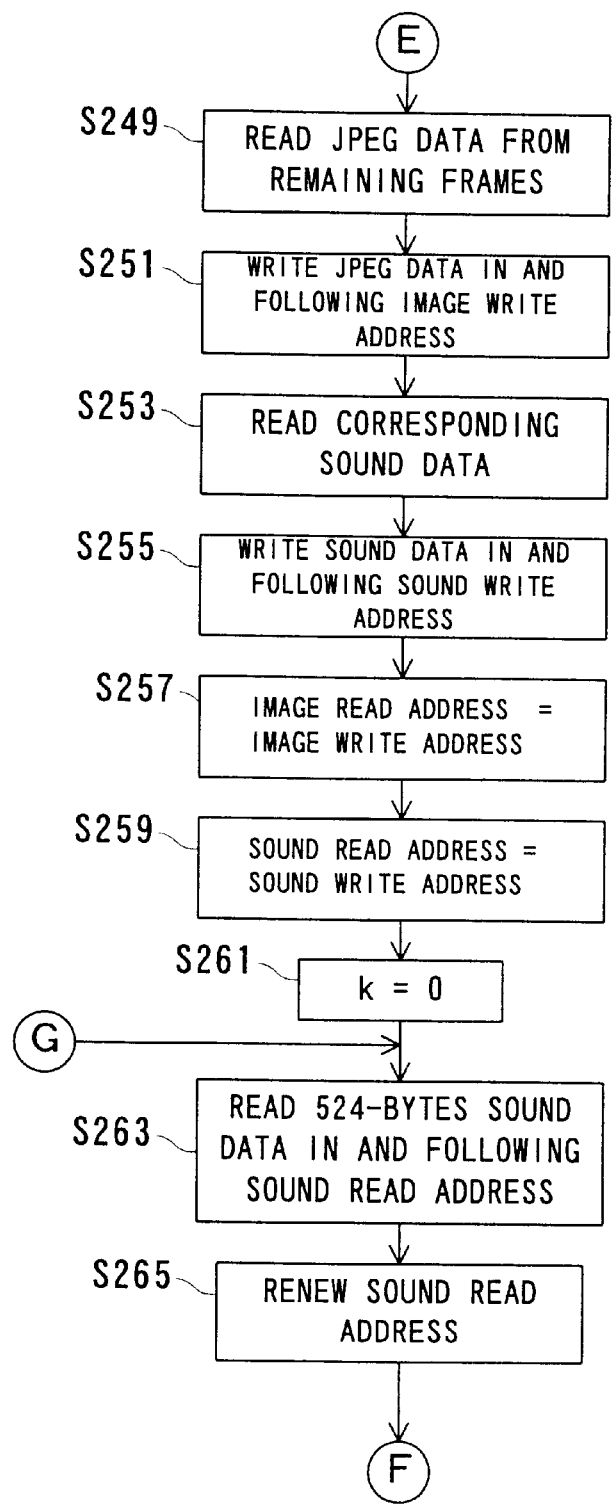
FIG. 12 is a flowchart showing yet another part of the operation of the FIG. 7 embodiment.
Figure 13:
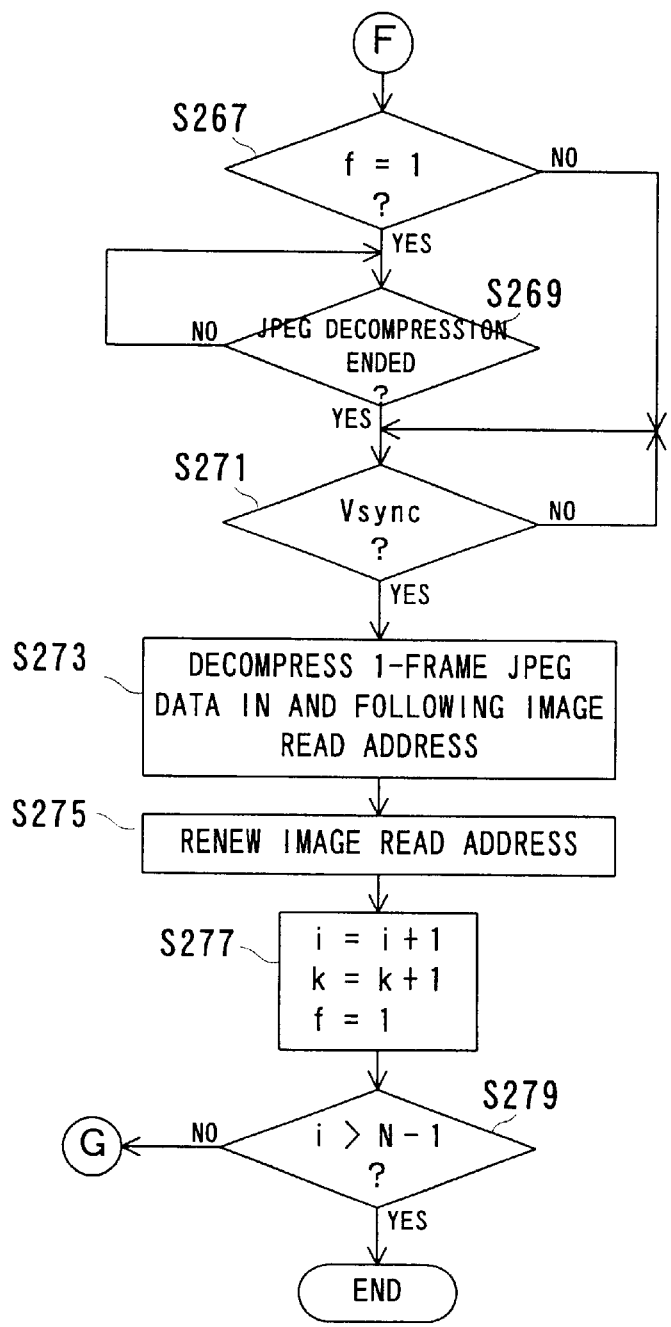
FIG. 13 is a flowchart showing another part of the operation of the FIG. 7 embodiment.

If "NO" is determined in step S213, the steps S249–S279 shown in FIG. 12 and FIG. 13 are processed. These processes are similar to the above process of steps S215–S247 and accordingly duplicated explanations thereof are omitted as large as possible.

The compressed image data and sound data to be processed in step S249 and the subsequent are, respectively, less than 15 frames and less than 1 second. Accordingly, in step S249 all the remaining compressed image data is read out and in step S253 all the remaining sound data is read out. In step S279 the current frame number i is compared with "N−1". If I≦N−1, the process returns to step S263 while if i>N−1, the process is ended. That is, reproduction for all the motion images and sounds are completed at the time N−1 is determined, and accordingly the process is ended.

According to this embodiment, the SDRAM is written by compressed image data in amount of 15 frames a time and sound data in amount of 1 second a time, wherein these of data are renewed with the next compressed image data and sound data after completing predetermined image and sound processes. It is therefore possible to reduce the SDRAM capacity as compared to the prior art requiring writing, to an SDRAM, all the compressed image data and sound data to be reproduced.

Incidentally, although in both the above embodiments the image data reproduced from a memory medium is compressed image data having been compressed according to the JPEG scheme, the present invention is also applicable to a case of reproducing the compressed image data having been compressed according to the MPEG scheme. However, the data compressed according to the MPEG scheme is in a stream structure that only a difference frame possesses image information in an amount of 1 frame. Consequently, where compressed image data is intermittently read out of a desired frame as in the first embodiment, this desired frame is a reference frame provided at an interval of plurality of frames. As a result, motion images reproduced at high speed will be displayed on the monitor. On the other hand, where compressed image data is intermittently read out by a plurality of frames a time as in the second embodiment, a reference frame may be provided at a head of the plurality of frames. By doing so, motion images produced at normal speed will be displayed on the monitor.

Also, although the embodiments were explained using a digital camera, it is needless to say that the invention is applicable to every electronic appliance to reproduce motion images.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A motion image reproducing apparatus for reproducing from a record medium a plurality of frames of compressed image data that correspond to a motion image at a high speed which is N times a normal speed, comprising:

a selector for selecting in response to a timing signal which is periodically generated a frame number which exists every predetermined number of frames out of continuous frame numbers, said predetermined number being N, wherein N, is greater than 1;

an image transferor for transferring from said record medium to an internal memory the compressed image data of one frame corresponding to the frame number selected by said selector; and a decompressor for decompressing the compressed image data stored in said internal memory in a ratio of one frame per one of the timing signal.

2. A motion image reproducing apparatus according to claim 1, wherein the compressed image data of one frame stored in said internal memory is renewed by the compressed image data of one frame transferred with delay by said image transferor.

3. A motion image reproducing apparatus according to claim 1, wherein said internal memory has at least two storage areas each of which stores the compressed image data of one frame, said displayer displaying an image based on the compressed image data of one frame stored in one of said storage areas, and said image transferor transferring the compressed image data of one frame to a storage area not under a display process.

4. A motion image reproducing apparatus according to claim 1, further comprising:

a displayer for displaying a motion image based on image data decompressed by said decompressor.

5. A motion image reproducing apparatus according to claim 1, wherein the compressed image data is image data compressed by a JPEG format.

6. A motion image reproducing apparatus according to claim 1, wherein said record medium further records sound data related to the compressed image data, and the apparatus further comprising:

a sound transferor for transferring from said record medium to said internal memory the sound data corresponding to the compressed image data transferred by said image transferor; and a sound outputter for outputting a sound based on the sound data stored in said internal memory.

7. A motion image reproducing apparatus for reproducing from a record medium compressed image data that corresponds to a motion image and has every one frame compressed, comprising:

an image transferor for transferring from said record medium to an internal memory the compressed image data corresponding to one frame in response to a timing signal which is periodically generated;

a decompressor for decompressing the compressed image data corresponding to one frame stored in said internal memory in response to the timing signal; and a displayer for displaying a motion image based on image data decompressed by said decompressor, wherein said record medium is a semiconductor memory.

8. A motion image reproducing apparatus according to claim 7, wherein the compressed image data corresponding to one frame stored in said internal memory is renewed by the compressed image data corresponding to one frame transferred with delay by said image transferor.

9. A motion image reproducing apparatus according to claim 7, wherein said internal memory has at least two storage areas each of which stores the compressed image data corresponding to one frame, said displayer displaying an image based on the compressed image data corresponding to one frame stored in one of said storage areas, and said image transferor transferring the compressed image data corresponding to one frame to a storage area not under a display process.

10. A motion image reproducing apparatus according to claim 7, wherein the compressed image data is image data compressed by a JPEG format.

11. A motion image reproducing apparatus according to claim 7, wherein said record medium further records sound data related to the compressed image data, and the apparatus further comprising:

a sound transferor for transferring from said record medium to said internal memory the sound data corresponding to the compressed image data transferred by said image transferor; and a sound outputter for outputting a sound based on the sound data stored in said internal memory.

12. A motion image reproducing apparatus according to claim 7, further comprising a selector for selecting a frame number which exists every one frame out of continuing frame numbers, wherein said image transferor transfers the compressed image data corresponding to the frame number selected by the selector.

* * * * *